Jan. 20, 1953      R. J. KELLER      2,626,020
BRAKE
Filed April 14, 1948      2 SHEETS—SHEET 1
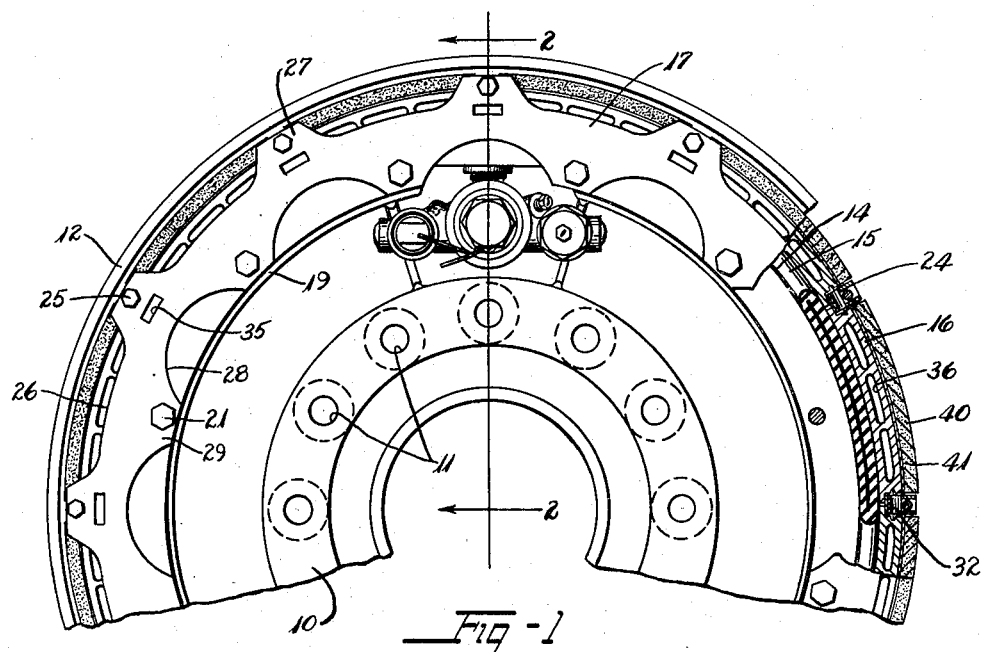
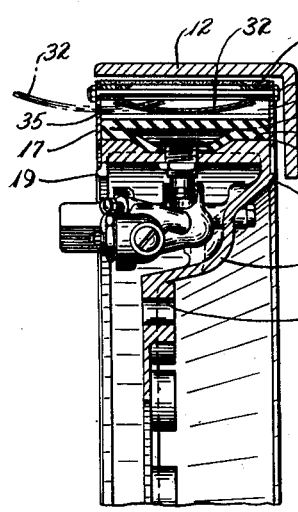
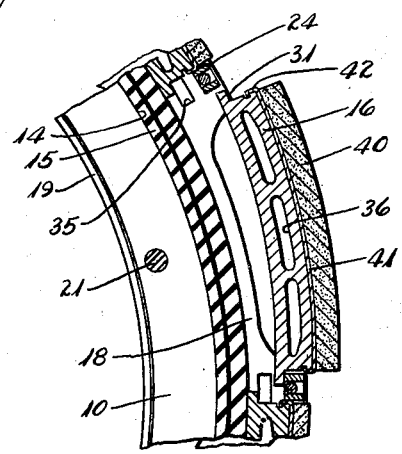
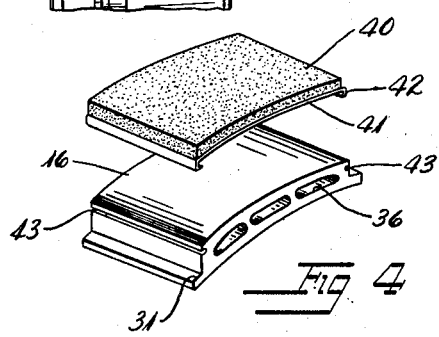
Inventor
Russell J. Keller
By
Atty.

Jan. 20, 1953 R. J. KELLER 2,626,020
BRAKE
Filed April 14, 1948 2 SHEETS—SHEET 2
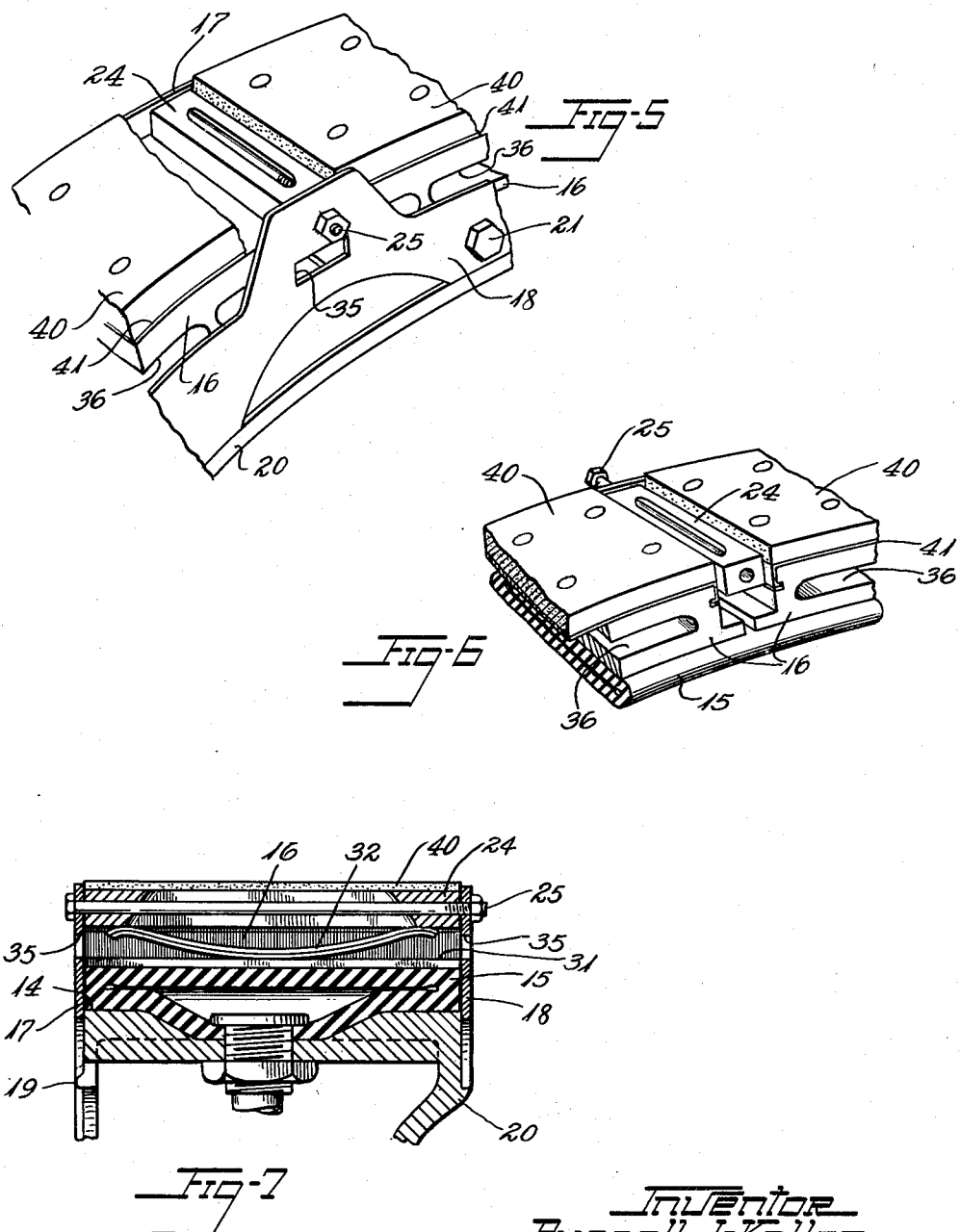
Inventor
Russell J. Keller Patented Jan. 20, 1953

2,626,020

UNITED STATES PATENT OFFICE 2,626,020

BRAKE

Russell J. Keller, Dayton, Ohio, assignor to The B. F. Goodrich Company, New York, N. Y., a corporation of New York Application April 14, 1948, Serial No. 21,031

5 Claims. (Cl. 188—152)

This invention relates to brakes of the expander tube type and is especially useful in brakes for aircraft.

Objects of the invention are to provide for quick replacement of the friction surfaces of the brake shoes, to provide for replacement of the brake shoes without substantial disassembly of the brake, to provide improved cooling of the brake shoes, and to provide economy of construction.

These and other objects will appear from the following description and the accompanying drawings.

Of the drawings,

Fig. 1 is a side elevation, partly broken away and partly in section, of a brake constructed in accordance with and embodying the invention.

Fig. 2 is a cross-section thereof, taken on line 2—2 of Fig. 1.

Fig. 3 is a detail sectional view taken circumferentially of the brake, showing a brake shoe in position of being removed from the brake.

Fig. 4 is a detail perspective view of a brake shoe and its removeable friction facing.

Fig. 5 is a perspective view of a portion of the brake of Fig. 1 at one of the torque bars, the brake drum being removed and part of a brake block being broken away.

Fig. 6 is a similar view with the annular side ring of the near side removed.

Fig. 7 is an enlarged view of a portion of Fig. 2, other parts being broken away.

Referring to the drawings, the numeral 10 designates a stationary torque member of a brake having a series of bolt holes 11 for attaching it to a vehicle within a rotatable brake drum 12. The torque member has a cylindrical axially disposed seat 14 for supporting an inflatable expander tube 15. Arcuate brake shoes 16 are arranged in end-to-end spaced-apart relation about the expander tube and are supported thereon for radial movement toward and from the brake drum.

For confining the brake shoes, annular rings 17, 18 preferably of sheet metal, are secured at opposite sides of the torque member and are centered by annular ledges 19, 20 thereof and retained thereon by bolts 21. The annular rings 17, 18 provide, with the torque member, an annular peripheral channel for confining the expander tube and the brake shoes laterally.

For resisting torque, the torque bars 24 extend across the channel from ring 17 to ring 18 at regular intervals and are of rectangular crosssection, are slotted radially of the brake drum, have longitudinal passages, and bolts 25 extend therethrough and through the annular rings 17, 18.

In order to provide for good ventilation of the brake and at the same time to reduce its weight, which is an important matter in the design of aircraft structures, the rings 17, 18 are of skeletal construction having notches 26 peripherally thereof between the bolt ears 27 along their outer margins and having lunar openings 28 at their inner margins between the bolt ears 29.

Mounted between the rings 17, 18 upon the expander tube are arcuate brake shoes 16 each spanning the arc between the centers of the torque bars and having rebated ends providing end portions 31 of reduced thickness underlying the torque members. Arcuate leaf springs 32 are inserted between the reduced end portions 31 and the inner faces of the torque bars 24 under tension, and provide for return of the shoes when the expander tube is deflated. The springs may be positioned and removed without removal of the rings 17, 18, openings 35 being provided through the rings 17, 18 for this purpose.

For cooling the brake shoes and at the same time reducing their weight without materially reducing their rigidity, cross passages 36 are formed through the shoes at intervals as by coring them. The cross passages communicate with the notches 26 and permit free circulation of air.

Due to the difference in the chord distance of the shoes and that of the space between the torque bars, brought about by difference of radial disposition thereof, as well as to the rebating of the ends of the shoes, the shoes may be removed individually from the brake, after the springs adjacent thereto have been removed through openings 35, by arcuately moving a shoe outwardly at one end while holding the other end against a torque bar, as shown in Fig. 3, making possible the replacement of single shoes without a complete disassembly of the brake member.

Upon removal of a brake shoe, the friction surface thereof is readily removeable therefrom and for this purpose, a block of friction material 40 is slideably removeable axially of the shoe but is retained against such movement when the shoe is in braking position. For this purpose the block 40 may be integrally united with a sheet metal liner 41 having inwardly turned end ledges 42 receivable in axial grooves 43 of the shoes. The construction is such as to permit quick replacement of the friction surface when the shoe is removed from the brake.

In the normal position of the brake shoes, the springs 32 are of such width as to substantially overlie the entire surface of the ends 31 of the brake shoes and hold the brake shoes against circumferential movement. At such working position the inwardly turned ends 42 of the liner 41 are confined between the torque bars 24 so that they cannot be released from the brake shoes by braking forces applied thereto.

Variations may be made without departing

I claim:

1. Frictional mechanism comprising inner and outer concentric relatively rotatable members, said inner member comprising an annular support, removable side flanges thereon defining therewith a channel for supporting an expander tube, a plurality of arcuate friction shoes in said channel, torque bars extending between said flanges across said channel between ends of the shoes, said shoes having end extensions of reduced thickness normally underlying said torque bars, and spring means over said extensions for retracting said shoes, said side flanges having openings therethrough, said spring means being removable through said openings in said side flanges, and said shoes and said torque bars being of such relative arcuate dimensions and spacing as to permit removal of said shoes by an outwardly swinging movement of one end thereof upon removal of said spring means without removal of said side flanges.

2. Frictional mechanism comprising inner and outer concentric relatively rotatable members, said inner member comprising an annular support, removable side flanges thereon defining therewith a channel for supporting an expander tube, a plurality of arcuate friction shoes in said channel, torque bars extending between said flanges across said channel between ends of the shoes, said shoes having end extensions of reduced thickness normally underlying said torque bars, and spring means over said extensions for retracting said shoes, said side flanges having openings therethrough, said spring means being removable through said openings in said side flanges, said shoes and said torque bars being of such relative arcuate dimensions and spacing as to permit removal of said shoes by an outwardly swinging movement of one end thereof upon removal of said spring means without removal of said side flanges, and said shoes having friction facings removable therefrom by movement axially thereof when said shoes are removed from said side flanges and locked thereto when said shoes are mounted between said side flanges.

3. Frictional mechanism comprising inner and outer concentric relatively rotatable members, said inner member comprising an annular support, removable side flanges thereon defining therewith a channel for supporting an expander tube, a plurality of arcuate friction shoes in said channel, torque bars extending between said flanges across said channel between ends of the shoes, said shoes having end extensions of reduced thickness normally underlying said torque bars, and spring means over said extensions for retracting said shoes, said side flanges having openings therethrough, said spring means being removable through said openings in said side flanges, said shoes and said torque bars being of such relative arcuate dimensions and spacing as to permit removal of said shoes by an outwardly swinging movement of one end thereof upon removal of said spring means without removal of said side flanges, and said side flanges and said shoes having ventilating openings axially of the structure and communicating with each other for cooling the mechanism.

4. Frictional mechanism comprising inner and outer concentric relatively rotatable members, said inner member comprising an annular support, removable side flanges thereon defining therewith a channel for supporting an expander tube, a plurality of arcuate friction shoes in said channel, said shoes having cross openings therethrough for permitting circulation therethrough for cooling them, and stop means secured to said side flanges and extending between said shoes for limiting relative rotative movement of said inner member and said shoes, said side flanges being of skeletal construction having outer peripheral notches between the positions of attachment of said stop means and having lunar notches in the inner periphery thereof providing ventilation of said shoes, and said flanges extending radially outward of the notches at said stop means therebetween for laterally confining the shoes at said stop means, said friction shoes having friction facings removable therefrom by lateral sliding movement when said shoes are removed from said channel and being locked in place by said side flanges at said stop means in the assembled relation of the mechanism.

5. Frictional mechanism comprising inner and outer concentric relatively rotatable members, said inner member comprising an annular support, removable side flanges thereon defining therewith an outwardly open channel for supporting inflatable expander means, a plurality of arcuate friction shoes in said channel about said expander means, said shoes having cross openings therethrough providing for circulation of air therethrough for cooling them and each having a friction facing removable therefrom by movement laterally thereof when the shoe is removed from the channel, stop means secured to said side flanges and extending across said channel between adjacent shoes for limiting relative movement of said inner member and said shoes, said shoes having ends of reduced radial thickness extending under said stop means, retractor springs mounted between said reduced ends of the shoes and said stop means, said side flanges having openings therethrough at said stop means for removing said springs, and ventilating openings between said stop means communicating with the cross openings of said shoes, said shoes being insertable with their reduced ends extending under said stop means and removable by outwardly swinging movement when said springs are removed without removal of said flanges or stop means, and said flanges having portions flanking said shoes at the reduced ends of the shoes for retaining said removable facings on said shoes against lateral movement when said shoes are between said flanges.

RUSSELL J. KELLER.

REFERENCES CITED

The following references are of record in the file of this patent:

UNITED STATES PATENTS

| Number | Name | Date |
|---|---|---|
| 1,532,141 | Kenyon | Apr. 7, 1925 |
| 1,780,200 | Linderman | Nov. 4, 1930 |
| 1,805,655 | Down | May 19, 1931 |
| 2,027,822 | Hoffman | Jan. 14, 1936 |
| 2,100,174 | Ruffino | Nov. 23, 1937 |
| 2,311,113 | Klocke | Feb. 16, 1943 |
| 2,350,039 | Hollerith | May 30, 1944 |
| 2,434,762 | Fawick | Jan. 20, 1948 |
| 2,457,344 | Butler | Dec. 28, 1948 |
| 2,473,646 | Hollerith | June 21, 1949 |
| 2,480,270 | Stewart | Aug. 30, 1949 |

FOREIGN PATENTS

| Number | Country | Date |
|---|---|---|
| 509,781 | Great Britain | July 20, 1939 |